Nov. 14, 1939.  D. S. CASLEY  2,180,032
LOAD CARRIER
Filed Aug. 2, 1938  2 Sheets-Sheet 1
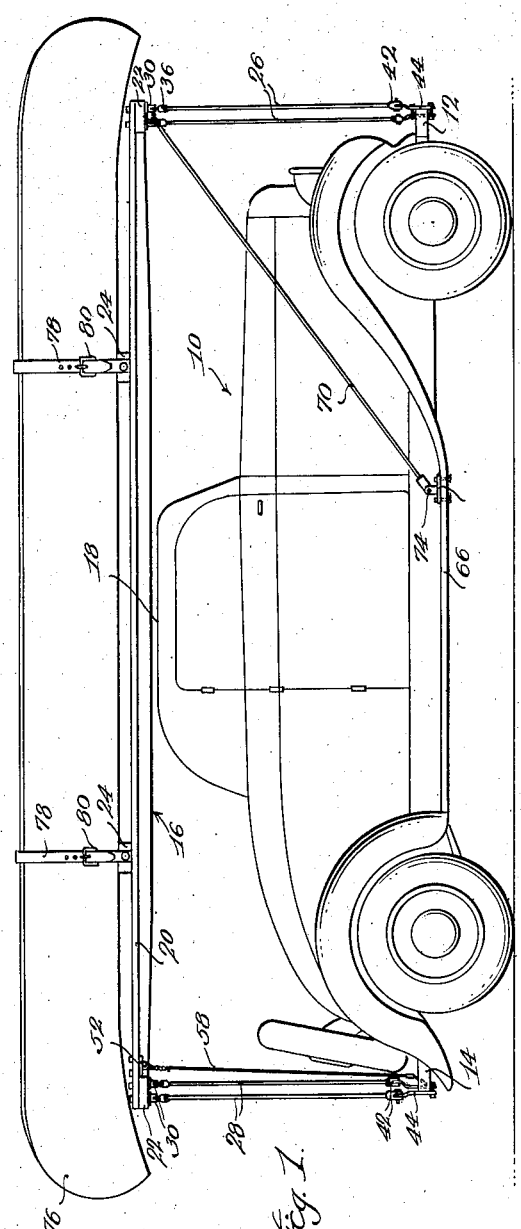
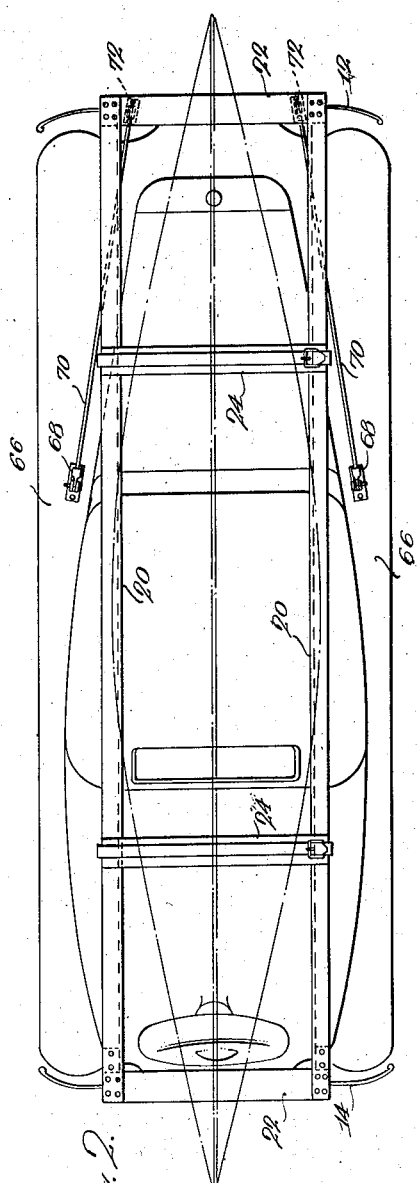
Dallas S. Casley
INVENTOR
BY Victor J. Evans & Co.
ATTORNEYS Nov. 14, 1939.   D. S. CASLEY   2,180,032
LOAD CARRIER
Filed Aug. 2, 1938   2 Sheets-Sheet 2
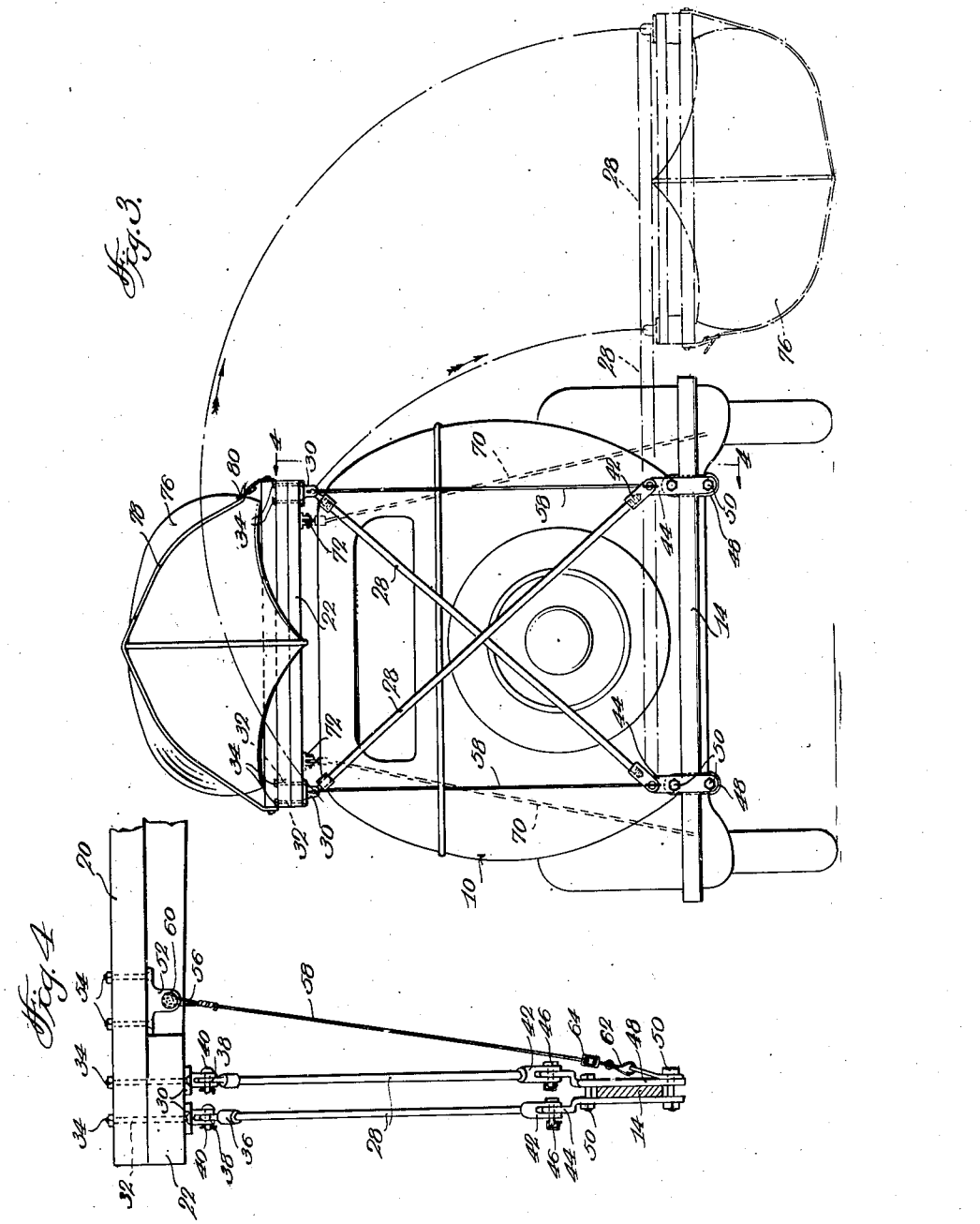
Dallas S. Casley
INVENTOR
BY Victor J. Evans & Co.
ATTORNEYS Patented Nov. 14, 1939

2,180,032

UNITED STATES PATENT OFFICE 2,180,032

LOAD CARRIER

Dallas S. Casley, Belpre, Ohio

Application August 2, 1938, Serial No. 222,703

3 Claims. (Cl. 214—77)

My invention relates to vehicles and has among its objects and advantages the provision of an improved load carrier.

An object of my invention is to provide a carrier adapted for connection with pleasure cars in which the carrier embodies novel means facilitating loading and unloading of heavier loads and in which the carrier is designed to facilitate connection with cars of conventional design.

A further object is to provide a carrier which may be associated with vehicles for load carrying purposes in which the carrier includes novel structure so designed as to swing the carrier to one side of the vehicle for loading purposes.

A further object is to provide a carrier for connection with vehicles in which the carrier supports the load above the vehicle together with novel means for swinging the carrier to one side of the vehicle and down upon the load to be carried thereby. After the load has been connected with the carrier, mere shifting of the latter to a position above the vehicle reverses the carrier so as to bring the load to a position on top of the carrier.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is an elevational view of an automobile showing my carrier applied thereto;

Figure 2 is a top plan view;

Figure 3 is a rear elevational view of the vehicle illustrating the manner in which the carrier may be shifted to a position along side the vehicle for loading or unloading purposes; and Figure 4 is an enlarged view taken along the line 4—4 of Figure 3.

In the embodiment selected to illustrate my invention, I make use of an automobile 10 provided with the usual front and rear bumpers 12 and 14, respectively. The load carrier is indicated generally at 16 and is supported above the top 18 of the vehicle. Carrier 16 may comprise longitudinal frame members 20 and interconnecting end frame members 22. Transverse brace members 24 may be connected with the frame members 20 at suitable intervals. Carrier 16 is mounted on the front and rear bumpers 12 and 14 through the medium of front struts 26 and rear struts 28. Struts 26, their connection and operation are identical with both of the struts 28, so that the description of one set will apply to both. Figures 3 and 4 illustrate the specific construction of the rear struts 28.

To the rear cross member 22 I connect a pair of U-shaped brackets 30, each of which includes bolts 32 extending through openings in the cross member 22 and the frame members 20. Brackets 30 are fixedly secured in their respective positions through mere tightening of the nuts 34 threaded through the bolts 32. Struts 28 may comprise rods or tubing and each strut is provided with a fitting 36 at its upper end having a plate 38 shaped to fit between the flanges of its respective bracket 30. The plates 38 are provided with openings aligned with the openings in the U-shaped brackets 30 for the reception of key pins 40. Each strut 28 is provided with a U-shaped fitting 42 at its lower end for connection with a plate 44. The plates 44 are provided with openings aligned with openings in the U-shaped fittings 42 for the reception of key pins 46.

Figure 4 illustrates the manner in which one of the plates 44 is connected with the rear bumper 14. The plate 44 illustrated bears against one side of the bumper 14 and a plate 48 bears against the opposite side of the bumper directly opposite the plate 44. Plates 44 and 48 are provided with aligned openings for the reception of bolts 50 which clamp the two plates upon the bumper, to provide a fixed support for the lower end of the associated strut 28. To each of the frame members 20 I connect a U-shaped bracket 52 by bolts 54. Between the flanges of the brackets 52 I position and connect loops 56 formed at the upper ends of guy wires 58. The brackets 52 carry pins 60 extending through the loops 56. Each guy wire 58 is looped at 62 at its lower end and connected with an eye plate 64 clamped against one of the plates 48 by the lower bolt 50 passing through the plate 48. A turnbuckle 64 may be interposed in each of the guy wires for taking up the slack therein.

Struts 28 are pivotally connected at both ends with their respective supporting brackets, but the guy wires 58 restrain the carrier 16 from lateral shifting. To each of the running boards 66 of the vehicle, I bolt brackets 68 which are detachably connected with the lower ends of brace struts 70. The front cross member 22 carries two brackets 72 to which the upper ends of the brace struts 70 are connected. Brackets 68 and 72 may be U-shaped in the same manner as the brackets 30, while the ends of the brace struts may have the same type of connection with the brackets 72 as the connection between the struts 28 and the brackets 30. The lower ends of the brace struts 70 may be easily and quickly detached from the brackets 68 through removal of the pins 74. Carrier 16 is restrained from relative longitudinal shifting because of the brace struts 70.

For the purpose of illustration, I have illustrated a boat 76 as being mounted on the carrier 16. Strap 78 may be connected with the carrier for encircling the boat 76, to hold the boat in fixed relation with the carrier. The strap 78 may be provided with conventional buckles 80.

From the foregoing description of the various parts of the device, the operation thereof will be readily understood. With the guy wires 58 and the brace struts 70 in place, the carrier 16 is supported in a sturdy manner above the top of the vehicle. By loosening the guy wires 58 and the brace struts 70, the carrier 16 may be swung to one side of the vehicle, as illustrated in Figure 3. Since the struts 26 are identical with the struts 28, the two sets of struts constitute a linkage between the carrier 16 and the bumpers 12 and 14. Figure 3 illustrates the lateral position of the carrier 16 in dotted lines. Struts 26 are arranged in cross relation, which is also true of the struts 28. As the carrier 16 is swung from the full line position to its dotted line position, the carrier 16 is reversed. In other words, shifting of the carrier from its position above the vehicle to its lateral or lower position rotates the carrier 16 about its longitudinal axis.

With my invention, the load may be located adjacent the vehicle and the carrier 16 swung down over the load. The load may then be strapped to the carrier or otherwise secured thereto. After attachment of the load, a carrier is swung upwardly, during which movement the carrier will be rotated to an upright position above the vehicle. The guy wires 58 and the brace struts 70 are then made secure. The lower ends of the struts 26 and 28 may be disconnected from the bumpers and swung upwardly underneath the carrier and secured thereto as by tying or the provision of suitable clips (not shown). Thus the carrier 16 may be secured to an overhead support and the vehicle driven out from under the carrier. With the carrier and load stored in this manner, the vehicle may be driven underneath the carrier for connection with the bracing and supporting struts. The linkage connection between the carrier and the vehicle constitutes an aid in lifting the carrier and its load to an upright position. According to Figure 3, as the carrier is swung upwardly the struts 26 and 28 carry a progressively increasing amount of the load as the carrier and its load are moved to higher positions. In this way, the load to be lifted is decreased as the elevated positions increase, thus making it easier for the operator to handle the load at the higher position.

I claim:

1. In combination with a vehicle including front bumper means and rear bumper means, a load carrying frame of rectangular contour, crossed struts pivotally connected with the rear corners of said frame and with the rear bumper means, crossed struts pivotally connected with the forward corners of the frame and with the front bumper means, and bracing means between the frame and the vehicle, said struts being adapted to support the frame above the vehicle and being further adapted to swing the frame laterally of the vehicle, said struts being so arranged as to rotate the frame substantially 180 degrees about its longitudinal axis when moved from either position to the other.

2. In combination with a vehicle including front bumper means and rear bumper means, a load carrying frame of rectangular contour, crossed struts pivotally connected with the rear corners of said frame and with the rear bumper means, crossed struts pivotally connected with the forward corners of the frame and with the front bumper means, bracing means between the frame and the vehicle, said struts being adapted to support the frame above the vehicle and being further adapted to swing the frame laterally of the vehicle, said struts being so arranged as to rotate the frame substantially 180 degrees about its longitudinal axis when moved from either position to the other, and tie means between the frame and one of said bumper means to restrain the frame from lateral shifting when positioned above the vehicle.

3. In combination with a vehicle including a front bumper structure and a rear bumper structure, a load carrying frame of rectangular contour, crossed struts pivotally connected with the frame at its rear corners and with the rear bumper structure, crossed struts pivotally connected with the frame at its front corners and with said front bumper structure, and bracing means between the frame and the vehicle and the rear bumper structure to restrain the frame from relative longitudinal and lateral shifting when in a position above the vehicle, said struts being adapted to swing the frame laterally of the vehicle in either direction, said struts being so arranged as to rotate the load carrier substantially 180 degrees when moved from a position above the vehicle to either of its positions laterally of the vehicle.

DALLAS S. CASLEY.